March 14, 1933.  M. W. McARDLE  1,901,314
GRIDDLE
Filed July 3, 1930  3 Sheets-Sheet 1
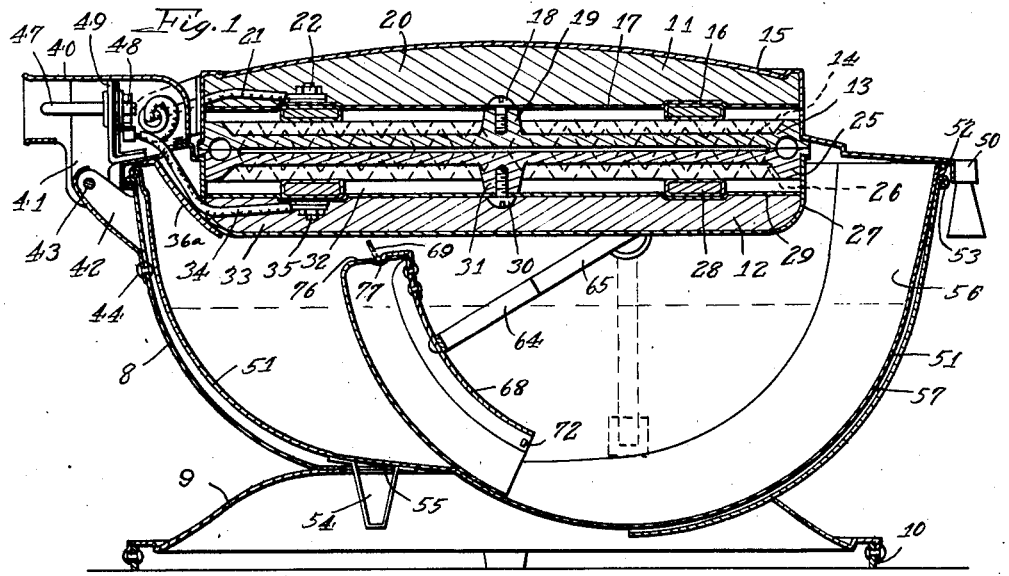
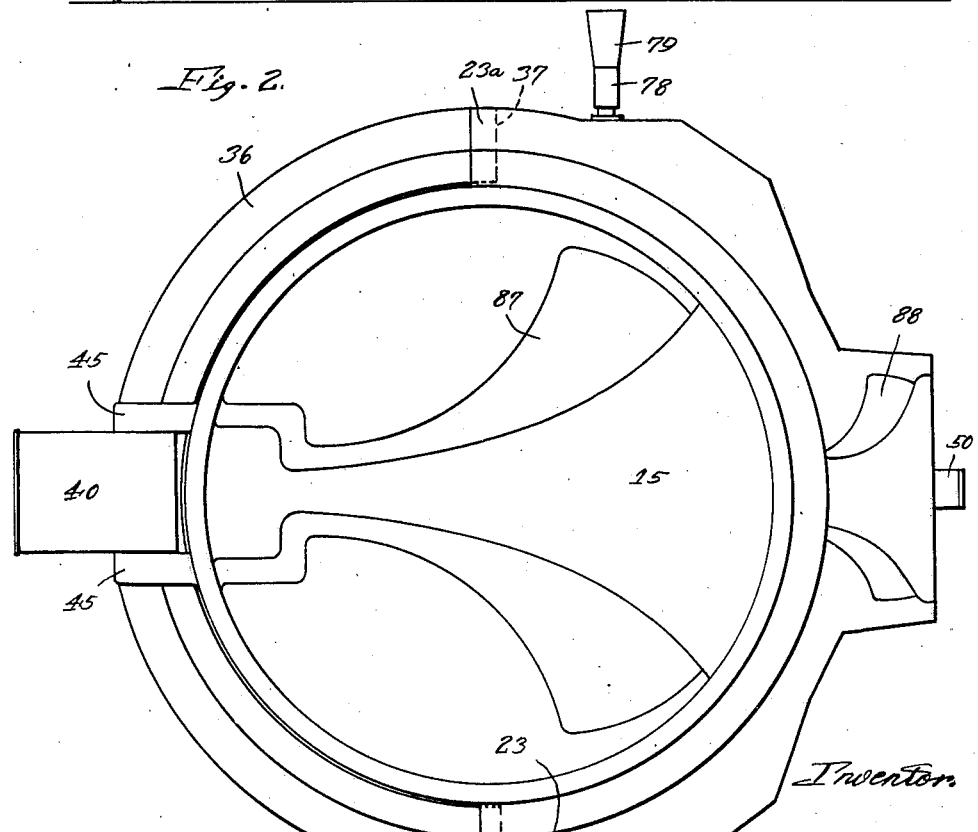
Inventor
Michael W. McArdle
By Wilson, Dawell, McCanna & Rehm
Attys.

March 14, 1933. M. W. McARDLE 1,901,314
GRIDDLE
Filed July 3, 1930  3 Sheets-Sheet 2

Inventor:
Michael W. McArdle
By Wilson, Dowell, McCanna & Lehm
Attys.

March 14, 1933.　　　M. W. McARDLE　　　1,901,314
GRIDDLE
Filed July 3, 1930　　　3 Sheets-Sheet 3
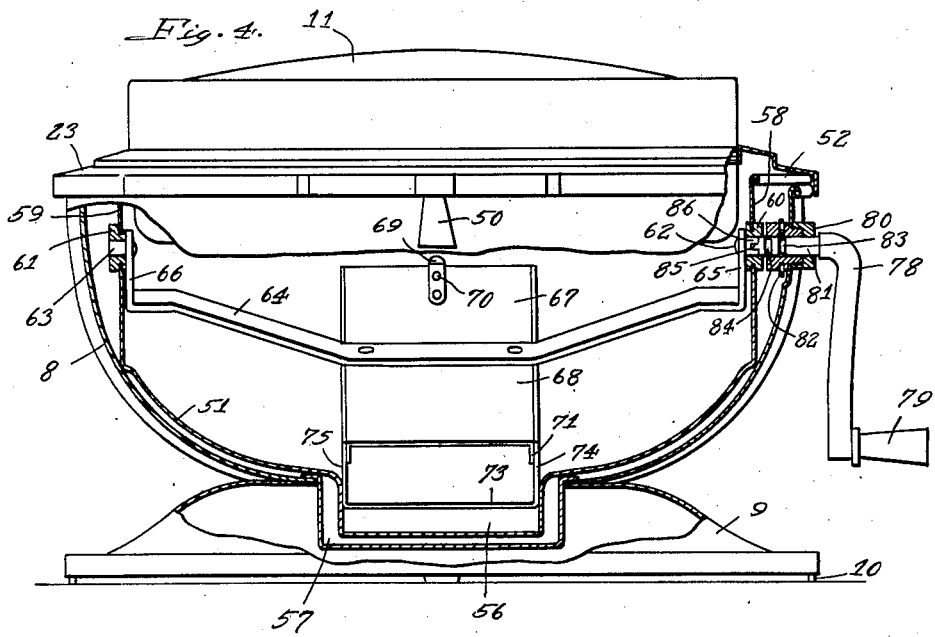
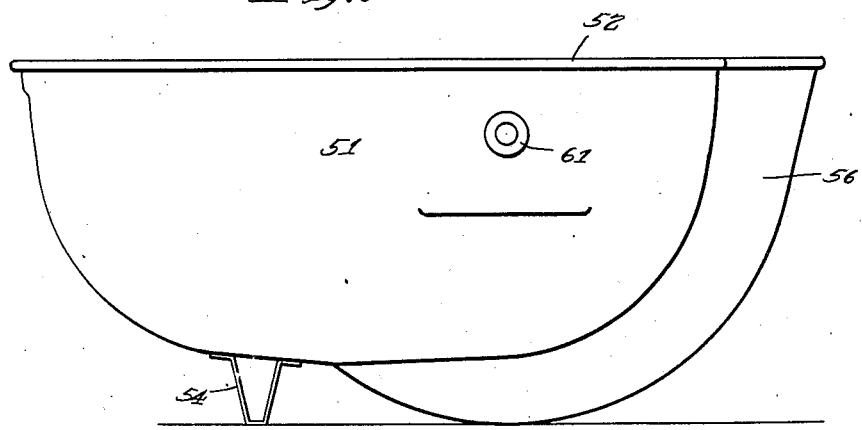
Inventor
Michael W. McArdle
By
Wilson, Dowell, McCanna & Lehm
Attys.

Patented Mar. 14, 1933

1,901,314

UNITED STATES PATENT OFFICE

MICHAEL W. McARDLE, OF CHICAGO, ILLINOIS

GRIDDLE

Application filed July 3, 1930. Serial No. 465,511.

My invention relates to griddles and has particular reference to the so-called waffle iron type wherein a pair of corrugated irons are placed in juxtaposition and are adapted to receive a suitable dough or batter therebetween, the irons being heated to cook the batter to form a food product.

It is becoming customary to prepare many of the light foods directly at the dining table during the meal in which they are to be eaten, in order to avoid a great deal of work in moving back and forth between the dining table and the stove, and to insure the freshness of the food article. This is the case with various types of griddle cakes such as waffles. It is quite customary now to employ electrically heated waffle irons directly on the dining table where the waffles are prepared as eaten. However, this has necessitated the use of a pitcher or container for the batter, in addition to the waffle iron, which has occupied considerable space and has been highly unsightly.

I have, therefore, aimed to provide a waffle iron wherein the container for the batter and the cooking elements are arranged in a single composite assembly.

I have further aimed to provide in a single unit, cooking elements, a container for the batter to be used upon the cooking elements, and means for transferring a desired quantity of batter from the container to the elements.

Another object of my invention is to provide a unitary assembly of this type wherein the container for the batter is removably secured within the base of the assembly whereby it may easily be removed for mixing the batter and for cleaning purposes after use.

A further object of the invention is the provision of a unitary assembly of this type wherein the container for the batter, and the means for transferring the batter from the container to the cooking elements are completely concealed during the normal operation of the waffle iron, whereby the assembly may present an ornamental appearance.

A still further object of the invention is the provision of a unitary assembly of this character wherein all of the parts are easily accessible and removable from the base.

I have also aimed to provide an improved measuring scoop for transferring a desired quantity of batter from the container to the cooking element.

A further object of the invention is to provide an improved container having shape characteristics causing it to be firmly secured within the base of the assembly and causing it to rest upright upon a flat surface when removed from the base.

Other objects and attendant advantages will be apparent to those skilled in the art from the following description and the accompanying claims in which—

Figure 1 is a vertical section through the center of the griddle;

Fig. 2 is a top view showing the upper griddle and the supporting flange;

Fig. 4 is a front view of the griddle partly in section showing the manner in which the crank is secured; and Fig. 5 is a side elevation of the container showing the shape characteristics thereof which cause it to rest upright upon a level surface.

Figure 3:
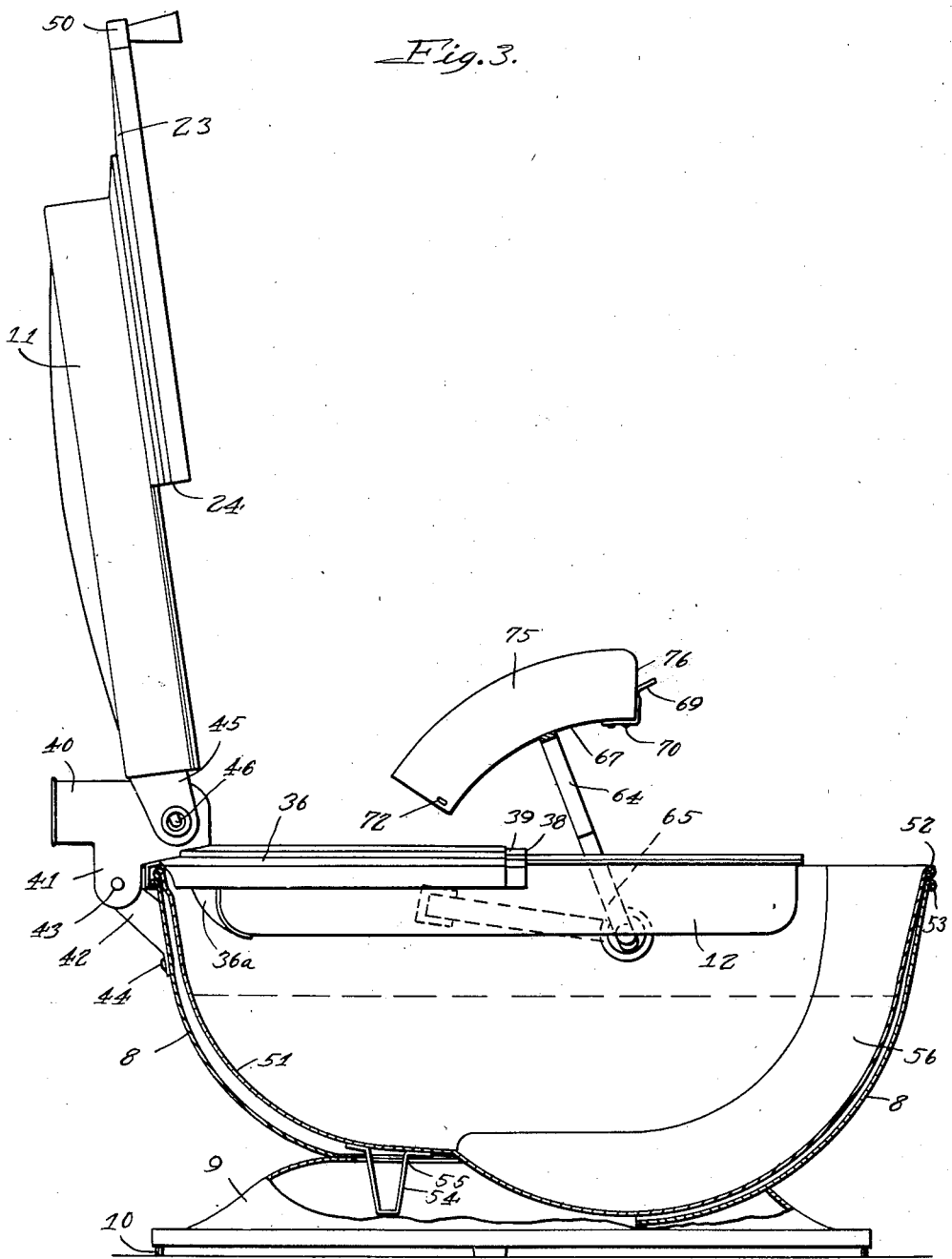
Fig. 3 is a side elevation of the griddle partly in section showing the scoop in a position to discharge upon the lower cooking element.

The invention contemplates the provision of at least one pair of cooking elements or so-called waffle irons electrically heated by suitable resistance coils and insulated to prevent the dissipation of an excess quantity of heat. The cooking elements are suitably supported upon a base which is provided with at least one removable container for holding the batter to be used with the cooking elements. Means are provided for transporting desired quantities of the batter to the cooking elements. The device is so arranged that the container for the batter and the batter transferring means are completely concealed during the normal operation of the griddle.

Referring now more particularly to Fig. 1, the griddle includes a bowl-like base 8 in the form of a tray having a suitable footing 9. A rubber cushioning ring 10 may be provided at the lower edge of the foot 9 if desired, to provide a cushion contact with the support or table. Upper and lower cooking elements or grids are designated respectively by the numerals 11 and 12.

The upper cooking element 11 is provided with a facing member 13 having corrugations 14 in the surface thereof for the purpose of giving suitable shape to the waffle to be formed against this surface. The member 13 is secured in a casing 15 in any suitable manner as, for example, by screws or the like not shown. A heating element 16, which in this particular instance is arranged in the shape of a ring, is secured to the top of the facing member 13 in any desired or suitable manner whereby the heat generated therein may be transmitted to the facing member. In this instance a metal sheet 17 is secured over the top of the heating elements 16 parallel to the facing member 13, and is attached to the latter through a screw 18 passing through the metal sheet 17 and into a projection 19 on the facing member 13. The space 20 between the sheet 17 and the top of the casing 15 may be filled with a suitable insulating material to prevent heat from being dissipated in this area. The heating element 16 is attached to a suitable source of electrical energy through wires 21 and bolts 22. While the casing 15 may be of any suitable or desired shape, in this instance I have shown it as being circular, as shown in Fig. 2, and having an outstanding flange 23a adapted to project laterally outward over the upper edge of the base 8. This flange extends from a point 23 at one side of the casing to a point 24, around substantially the front half of the casing 15. The casing 15 being smaller in circumference than the upper edge of the base 8, the flange 23 serves to conceal the upper edge of the base and to prevent the interior of the base from being visible.

The lower cooking element 12 is provided with a facing member 25 similar to the facing member 13 of the upper cooking element and is so positioned that the facing member 13 will rest thereon when the two cooking elements are in contact. Corrugations 26 serve to provide the desired shape characteristics to the food product being cooked thereon. The facing element 25 is secured in a lower casing 27 in any suitable or desired manner. A heating element 28 is positioned on the lower side of the facing member 13 and is adapted to provide heat thereto for the cooking operations. A metal sheet 29, secured to the facing member 25 through a screw 30 passing through the sheet and into a projection 31 of the facing member 25, serves to secure the heating element 28 against the facing member 13 and provide an air chamber 32. Suitable insulating material is positioned in the space 33 between the sheet 29 and the casing 27. Electrical energy is supplied to the heating element 28 through electric wires 34 attached to the element by means of screws and bolts 35. The casing 27 is provided at its upper edge with an outstanding flange 36 adapted to project laterally outward over the upper edge of the bowl 8 to support the casing 27 thereon and conceal the contents of the base from view. The flange 36 extends from a point 37 to a point 38 on the rear side of the casing and is provided at each end with a depression 39 to permit the flange 23 to overlap the former.

The flange 36 is fixedly secured to an electrical socket 40 which is provided with downwardly extending ears 41 pivotally secured to an upstanding bracket 42 by means of a pin 43. The bracket 42 is fixedly secured to the base 8 through rivets 44. The lower cooking element 12 is thus free to rotate about the pin 43 between a position partially covering the top of the base 8 and a position leaving the top of this base completely exposed, the element 12 occupying a substantially vertical position in the latter instance. The upper cooking element 11 is pivotally secured to the socket 40 through ears 45 extending on either side of the socket and pins 46, the cooking element 11 being free to rotate on the pins 46 between a horizontal position as shown in Fig. 1, and a substantially vertical position as shown in Fig. 3. The socket 40 is provided with conventional contact pins 47 adapted to engage a conventional electrical plug, bolts and nuts 48 at the rear end thereof serving to hold the pins 47 in position upon the support 49 and to connect the wires 21 and 34 thereto. A handle 50 may be suitably secured to the front of the flange 23 to be grasped with the hand in moving the upper cooking element 11 from the closed position as shown in Fig. 1 to the open position as shown in Fig. 3.

A metal strip 36a extends from the flange 36 to the side of the casing 27 at the rear of the latter beneath the socket 40 and serves to enclose the wires 34 to prevent the batter from coming in contact therewith.

A container or batter bowl designated generally by the numeral 51 is adapted to rest within the bowl shaped base 8 beneath the cooking elements 11 and 12 and is provided with an upper rolled edge 52 adapted to partially support the container upon the upper edge 53 of the base 8, as shown in Figs. 1 and 4. The rear side of the container 51 is provided with a leg 54 adapted to act in supporting the container when removed from the base 8 as shown in Fig. 5 and arranged to engage an opening 55 in the foot 9 of the base, when the container is positioned within the base to position the former therein. The forward side of the container is provided with an outwardly projecting channel 56 adapted to be received in a correspondingly shaped outwardly projecting channel 57 on the forward side of the base 8. When the container is positioned with the base 8 the channel 56 and the leg 54 serve to properly position the container therein. On the other hand, when the container 51 is rested upon a flat surface, as, for example, when being cleaned or when batter is being prepared therein, the leg 54 and the bottom of the channel 56 serve to support the container in an upright position.

The sides of the container 51 are flattened at 58 and 59, Fig. 4, and are provided with bearings 60 and 61, to receive bearing pins 62 and 63. These bearing pins are connected by means of a rod 64 having crank portions 65 and 66 at opposite ends thereof. A scoop or ladle designated generally by the numeral 67 is positioned at the center of the rod 64, the rod 64 being so bent as to cause the scoop 67 to closely fit within the channel 56 of the container 51.

The scoop 67 has a back member 68 of general rectangular shape, bent through an arc along its lengthwise direction. The rear end of the back portion 68 is provided with a latch 69 secured thereto by means of rivets 70. The side edges of the portion 68 are provided with downwardly projecting edges 71 having outwardly projecting fingers 72 near the front end thereof. A second portion 73 of rectangular cross-section and having side walls 74 and 75 and an end wall 76 is positioned opposite the back portion 68 of the scoop. The side walls 74 and 75 are each provided with openings adapted to receive the fingers 72 on the edges 71 of the back portion 68 and the end portion 76 is provided with a depression 77 into which the latch 69 is adapted to be received to maintain the fingers 72 within the openings in the side walls 74 and 75, thus releasably securing the portion 73 to the back portion 68. This scoop closely fits the channel 56 and is movable along the latter from the retracted position shown in Fig. 1 to the discharging position shown in Fig. 3, by rotation of the bearing pins 62 and 63 within the bearings 60 and 61 in the sides of the container 51.

A crank 78 having a handle 79 thereon is rotatably secured in the side wall of the base 8 through a sleeve 80 within which the shank 81 thereof is arranged to rotate. A spring detent 82 is adapted to engage either of two grooves 83 and 84 of the shank 81 to permit the crank 78 to be drawn outward so that the tongue 85 disengages a groove 86 of the bearing pin 62 or may be moved inward engaging the same. By operation of the crank 78 the scoop 67 may be caused to move along the channel 56 from the position shown in Figs. 1 and 4 to the position shown in Fig. 3, the scoop being loaded with batter held in the container 51 during its movement along the lower portion of the channel 56, and discharging the batter onto the cooking element 12 when it reaches the position shown in Fig. 3.

In operation my device will be seen to be exceedingly simple and expedient. During the storage period the griddle parts will occupy the position shown in Figs. 1 and 2, wherein the interior of the base 8, is completely concealed by the upper cooking element 11 and the outwardly extending flanges 23 and 36, the former attached to the upper cooking element 11 and the latter to the lower cooking element 12. These elements may be given various decorative configurations as indicated at 87 and 88.

When the griddle is to be used the operator grasps the handle 50 lifting the upper cooking element 11 to the position shown in Fig. 4. The operator may then, by grasping the front end of the lower cooking element 12, rotate both of the elements about the bearing pin 43 to a position exposing the entire interior of the base 8. In this position the crank 78 may be drawn outward releasing the tongue 85 of the handle from the groove 86 of the bearing pin 62. The container 51 may then be withdrawn from the base. By springing the sides 58 and 59 of the container outward the rod 64 may be removed from the container 51 carrying with it the scoop 67. The container 51 may then be used as shown in Fig. 5, for the preparation of the desired batter in the usual manner.

The scoop 67 may then be replaced within the container 51 and the whole again be inserted in the base 8 of the device. The crank 78 is moved inward causing the tongue 85 to engage the groove 86, and the lower cooking element 12 is lowered to the position shown in Fig. 3. The griddle is then ready for operation and a plug connected to a suitable source of electrical energy is inserted into the socket 40 whereby the cooking elements 11 and 12 are permitted to heat up under the action of the heating elements. When the cooking elements have reached a suitable temperature, operation of the crank 78 will move the scoop 67 from the position shown in Fig. 1 to that shown in Fig. 3, carrying with it a measured quantity of batter and depositing it upon the lower cooking element 12. Since the batter is ordinarily relatively thin it will flow from the point of discharge and cover the entire lower cooking element. This however, is immaterial in the case of waffle irons since the upper element 11 is then lowered upon the lower cooking element 12, and the contact of the two elements will cause the batter to be thoroughly distributed therebetween.

The cooking elements remain in this position until the waffle is completely cooked and is ready for removal from between the cooking elements, when the element 11 is lifted by means of the handle 50 and the waffle removed. The cooking elements may be recharged with fresh batter if desired or the upper cooking element 11 may be lowered to the position shown in Fig. 1. It will be observed that in this operative position the interior of the base 8 is completely concealed from view and that the raising of the upper cooking element, which must neccessarily be done to charge the griddle, also uncovers the upper end of the channel 56 and permits the scoop 67 to be projected therefrom. The rear part of the base 8 is covered at all times when the lower cooking element 12 is in place.

The advantages of my invention will be readily apparent. All of the equipment necessary for the making of waffles or other griddle cakes of similar nature are contained in a unitary structure. The batter and all portions of the structure liable to contamination by the batter are concealed from view at all times except when the griddle is actually being charged.

The container and the scoop are readily removable from the base of the griddle for cleaning purposes and for the purpose of preparing the batter in the first instance. The scoop may be made of suitable size to carry just sufficient batter to fill the space between the cooking elements whereby the messiness caused by misjudging the quantity of batter to be placed therein is obviated, the same quantity of batter being automatically measured and deposited upon the lower cooking element by such rotation of the crank on the side of the griddle.

The container is so shaped as to be automatically secured within the base and to rest upright when placed upon a flat surface. The scoop is formed to be readily disassembled for cleaning and to be readily removable from the container to permit the batter to be made up in the container and to permit the container to be easily cleaned.

While I have thus described and illustrated a specific embodiment of my invention I am aware that numerous alterations and changes may be made therein without materially departing from the scope of my invention and I do not wish to be limited except, as required by the prior art and the scope of the appended claims in which—

I claim:

1. An electric griddle comprising upper and lower grids, an open top batter bowl, a tray having a bowl supporting portion, said grids being supported over said bowl, and means connecting the grids to the tray, the batter bowl being positioned on said bowl supporting portion with the grids located so as to normally close the top of the batter bowl.

2. An electric griddle comprising upper and lower grids, an open top batter bowl, a tray having a bowl supporting portion, said grids being supported over said bowl, and means connecting the grids to the tray, the batter bowl being positioned on said bowl supporting portion with the grids located so as to normally close the top of the batter bowl, said means permitting the grids to be swung as a unit from said normal position to a position exposing the top of the batter bowl to permit access thereto.

3. An electric griddle comprising upper and lower grids, an open top batter bowl, a tray having a bowl supporting portion, said grids being supported over said bowl, and means connecting the grids to the tray, the batter bowl being positioned on said bowl supporting portion with the grids located so as to normally close the top of the batter bowl, said means permitting the grids to be swung as a unit from said normal position to a position exposing the top of the batter bowl to permit access thereto, and said means permitting the top grid to be independently swung from a closed position on the lower grid to an open position to permit transfer of batter from the batter bowl to the lower grid.

4. An electric griddle comprising a base in the form of a tray having a bowl supporting portion and an upstanding grid support at one side of the bowl supporting portion, an open top batter bowl removably supported on said tray, upper and lower grids normally overlying the batter bowl, the upper grid being pivotally mounted on said grid supporting portion, the upper grid being pivotally mounted to swing from a lower closed position on the lower grid to an upright open position, said batter bowl and said grids being constructed so that the top opening of the batter bowl is normally closed by said grids and the top grid is movable with respect to the batter bowl to expose said opening thereof and permit transfer of batter from said bowl to the lower grid.

5. An electric griddle comprising a base in the form of a tray having a bowl supporting portion and an upstanding grid support at one side of the bowl supporting portion, an open top batter bowl removably supported on said tray, upper and lower grids normally overlying the batter bowl, the upper grid being pivotally mounted on said grid supporting portion, the upper grid being pivotally mounted to swing from a lower closed position on the lower grid to an upright open position, said batter bowl and said grids being constructed so that the top opening of the batter bowl is normally closed by said grids and the top grid is movable with respect to the batter bowl to expose said opening thereof and permit transfer of batter from said bowl to the lower grid, and a ladle normally concealed in the batter bowl and movable through said accessible top opening for transferring batter from said bowl to said grid.

6. An electric griddle comprising upper and lower grids, an open top batter bowl, a support on which the batter bowl rests, and means normally supporting the grids on said support in a closed position above the batter bowl so that said grids will conceal the open top of said bowl, said grids being mounted to be swung as a unit about a pivot axis to expose the open top of the batter bowl, and the upper grid being mounted to be independently swung about a different pivot axis to an open position in which batter may be transferred from the bowl to the lower grid.

7. An electric griddle comprising an open top batter bowl, a support for said bowl, and upper and lower grids mounted on said support in a position normally closing the open top of the batter bowl,—one of said grids being movable with respect to the bowl to expose the open top thereof so that batter may be transferred from the bowl to the lower grid.

8. An electric griddle comprising an open top batter bowl, a support for said bowl, and upper and lower grids mounted on said support in a position normally closing the open top of the batter bowl, one of said grids being movable with respect to the bowl to expose the open top thereof so that batter may be transferred from the bowl to the lower grid, a ladle normally positioned in the bottom of the batter bowl, and means operable to move said ladle in a fixed path back and forth between its said normal position and a batter discharging position above the lower grid.

9. An electric griddle comprising an open top batter bowl, a support for said bowl, and upper and lower grids mounted on the support in a position normally closing the open top of the batter bowl, one of said grids being movable with respect to the bowl to expose the open top thereof so that batter may be transferred from the bowl to the lower grid, a ladle normally positioned in the bottom of the batter bowl, and means operable to move said ladle in a fixed path back and forth between its said normal position and a batter discharging position above the lower grid, including a support for the ladle mounted to oscillate about a pivot axis in proximity to the girds.

10. An electric griddle comprising upper and lower grids, an open top batter bowl, and means normally supporting said grids in a position closing the open top of the batter bowl, said means permitting said grids to be swung as a unit away from said position to give access to the open top of the batter bowl, and the upper grid being mounted to independently swing back and forth between a closed position and the lower grid to an upright open position.

11. An electric griddle comprising upper and lower grids pivotally connected together so that the upper grids may be swung back and forth between closed and open positions, an open top batter bowl, and means supporting the grids in a position over the bowl so that the grids close the open top of the bowl, and means permitting the grids to be swung out of said position to give access to said open top of the bowl.

12. An electric griddle comprising upper and lower grids constituting a grid unit, the upper grid of which is movable from a closed position on the lower grid to an open position away from the lower grid, an open top batter bowl, and means supporting said grid unit above and in proximity to the batter bowl, said grid unit having a peripheral flange overlying the peripheral portion of the open top bowl and serving with the grid unit to close the open top of said bowl, and means permitting relative movement between the grid unit and the bowl to expose the open top of the bowl for access thereto.

13. An electric griddle comprising a grid, a batter bowl located beneath the grids and having a bottom portion curved downwardly in a vertical plane, and a ladle having a curved bottom to fit said curvature of the bowl and operable to transfer batter from the bowl to the grid.

14. An electric griddle comprising a grid, a batter bowl located beneath the grids and having a bottom portion curved downwardly in a vertical plane, a ladle having a curved bottom to fit said curvature of the bowl, and means operable to move said ladle in a fixed path back and forth between a position in the bottom of the bowl in said curved portion thereof to a batter discharging position above the grid.

15. An electric griddle comprising a grid, a batter bowl located beneath the grid, a ladle having arcuate sides and open only at one end, said ladle being normally positioned in the bottom of the bowl, and means operable to move the ladle in an arcuate path approximately coincident with its arcuate sides back and forth between said normal position and a batter discharging position above the grid.

In witness of the foregoing I affix my signature.

MICHAEL W. McARDLE.